United States Patent
Noldus

(10) Patent No.: US 10,298,625 B2
(45) Date of Patent: May 21, 2019

(54) METHOD AND NETWORK ENTITY FOR SELECTING FOR A SUBSCRIBER A CALL SESSION ESTABLISHING SERVER TO BE REGISTERED WITHIN A VOICE OVER INTERNET PROTOCOL NETWORK

(75) Inventor: Rogier August Caspar Joseph Noldus, Goirle (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1464 days.

(21) Appl. No.: 14/117,813

(22) PCT Filed: May 19, 2011

(86) PCT No.: PCT/EP2011/058204
§ 371 (c)(1),
(2), (4) Date: Dec. 17, 2013

(87) PCT Pub. No.: WO2012/155988
PCT Pub. Date: Nov. 22, 2012

(65) Prior Publication Data
US 2019/0014156 A1    Jan. 10, 2019

(51) Int. Cl.
*G06F 15/173* (2006.01)
*G06F 17/00* (2019.01)
*H04L 29/06* (2006.01)

(52) U.S. Cl.
CPC ...... *H04L 65/1016* (2013.01); *H04L 65/1006* (2013.01); *H04L 65/1046* (2013.01); *H04L 65/1073* (2013.01); *H04L 65/80* (2013.01)

(58) Field of Classification Search
USPC .................. 709/227, 206, 204, 224, 223
See application file for complete search history.

(56) References Cited

U.S. PATENT DOCUMENTS 7,852,991 B1 * 12/2010 Croak ............... H04M 3/44
                                                        379/100.14
8,576,833 B2 * 11/2013 Qiu ................ H04M 7/0084
                                                        370/352
(Continued)

FOREIGN PATENT DOCUMENTS

WO    2009155978 A1    12/2009

OTHER PUBLICATIONS

Tirana et al. "Distributed Approaches to S-CSCF Selection in an IMS Network." IEEE 2010. IFIP Network Operations and Management Symposium. 224-231.
(Continued)

*Primary Examiner* — Jude Jean Gilles
(74) *Attorney, Agent, or Firm* — Murphy, Bilak & Homiller, PLLC

(57) ABSTRACT

Method and network node for selecting for a subscriber a call session establishing server to be registered with in a VoIP network. For the subscriber in a memory a subscriber list is maintained including for further subscribers a ranking representative of the relative frequency said subscriber has been engaged with that further subscriber in a session via the VoIP network. In the memory a server list is maintained and updated including identifiers of call session establishing servers, and for each of the listed call session establishing servers a ranking representative of the cumulative relative frequencies further subscribers registered with that call session establishing server have been engaged with the subscriber in a session via the VoIP network. From the server list the call session establishing server with the highest ranking is selected for the subscriber to be registered with.

14 Claims, 4 Drawing Sheets

| Subscriber S | | |
|---|---|---|
| Rank | < Public identity of further subscriber > | Percentage |
| 1 | < Public identity of further subscriber > | 34% |
| 2 | < Public identity of further subscriber > | 22% |
| 3 | < Public identity of further subscriber > | 9% |
| 4 | < Public identity of further subscriber > | 8% |
| 5 | < Public identity of further subscriber > | 6% |
| 6 | < Public identity of further subscriber > | 5% |
| 7 | < Public identity of further subscriber > | 4% |
| 8 | < Public identity of further subscriber > | 3% |
| 9 | < Public identity of further subscriber > | 3% |
| 10 | < Public identity of further subscriber > | 2% |
| | Total | 96% |

(56) References Cited

U.S. PATENT DOCUMENTS

| 8,812,700 B2* | 8/2014 | Lu ................. H04L 65/1016 |
| | | 709/229 |
| 2006/0294245 A1* | 12/2006 | Raguparan ........ H04L 29/06027 |
| | | 709/227 |
| 2008/0200143 A1* | 8/2008 | Qiu ..................... H04M 1/2535 |
| | | 455/404.2 |
| 2011/0194436 A1* | 8/2011 | Song ..................... H04W 76/27 |
| | | 370/252 |
| 2011/0225247 A1* | 9/2011 | Anantharaman ..... H04M 3/568 |
| | | 709/206 |

OTHER PUBLICATIONS

Peng et al. "Improving Performance and Reliability of IMS by Co-location DHT." 2010 International Conference on e-Education, e-Business, e-Management and e-Learning. IEEE 2010. 102-107.

Le et al. "A Novel P2P Approach to S-CSCF Assignment in IMS." IEEE CCNC 2008. 510-515.

Xu et al. "De-Registration Based S-CSCF Load Balancing in IMS Core Network." IEEE ICC 2009. 1-5.

Unknown, Author. "3rd Generation Partnership Project; Technical Specification Group Services and System Aspects; Feasibility Study on IMS Evolution; (Release 9)." 3GPP TR 23.812 V1.1.5. May 2011.

Peng, Y. et al. "Improving Performance and Reliability of IMS by Co-location DHT." International Conference on e-Education, e-Business, e-Management, and e-Learning. 2010.

* cited by examiner

| Subscriber S | | |
|---|---|---|
| Rank | < Public identity of further subscriber > | Percentage |
| 1 | < Public identity of further subscriber > | 34% |
| 2 | < Public identity of further subscriber > | 22% |
| 3 | < Public identity of further subscriber > | 9% |
| 4 | < Public identity of further subscriber > | 8% |
| 5 | < Public identity of further subscriber > | 6% |
| 6 | < Public identity of further subscriber > | 5% |
| 7 | < Public identity of further subscriber > | 4% |
| 8 | < Public identity of further subscriber > | 3% |
| 9 | < Public identity of further subscriber > | 3% |
| 10 | < Public identity of further subscriber > | 2% |
| | Total | 96% |

FIG. 1

METHOD AND NETWORK ENTITY FOR SELECTING FOR A SUBSCRIBER A CALL SESSION ESTABLISHING SERVER TO BE REGISTERED WITHIN A VOICE OVER INTERNET PROTOCOL NETWORK

TECHNICAL FIELD

The invention relates to Method and network entity for selecting for a subscriber a call session establishing server to be registered with in a Voice over Internet Protocol, VoIP, network.

BACKGROUND

Within a Voice over Internet Protocol (VoIP) network, such as an Internet Protocol (IP) Multimedia Subsystem (IMS) network, subscribers that register in that network will be allocated to a particular call session establishing server (such as a Serving Call Session Control Function (S-CSCF) server) of that network. The IMS network may contain one or multiple S-CSCF servers. Selection of a S-CSCF server for the subscriber is based on S-CSCF server capability. When the subscriber performs an initial registration, the Home Subscriber Server (HSS) informs the Interrogating Call session Control Function (I-CSCF) server about the S-CSCF capability required for this subscriber. The I-CSCF server then selects a S-CSCF server from a locally (within the I-CSCF serer) configured table of S-CSCF servers with supported capabilities.

The selection of the S-CSCF server for the subscriber is static. Once the subscriber is registered, the subscriber remains registered in that S-CSCF server, until the subscriber would de-register (explicitly by the subscriber or implicit through registration expiry). Also, when a failure occurs with the S-CSCF server, the subscriber may end up being registered in a different S-CSCF server.

Assuming that S-CSCF server failure should occur as infrequent as possible and further assuming that subscribers may remain registered for a long duration, a subscriber may end up being registered in a particular S-CSCF server for a long duration.

When the registered subscriber establishes a communication session such as a Voice call, either originating call or terminating call, then there will be a Session Initiation Protocol (SIP) session established with a further IMS subscriber. That further IMS subscriber may be registered in the same S-CSCF server or in a different S-CSCF server. Signaling related to this SIP session will traverse the S-CSCF server of the calling party as well as the S-CSCF server of the called party.

Signaling related to the initial Invite transaction of this SIP session will also traverse an I-CSCF server. The S-CSCF server and the I-CSCF server may be located in the same host (network node). A S-CSCF server may, when handling an initial Invite transaction, select the co-located I-CSCF server, provided that the destination party of the SIP session belongs to the same network. When the calling party and the called party are registered in the same S-CSCF server, then this will require less signaling for the initial Invite transaction related signaling compared to the case where calling party and called party are not registered in the same S-CSCF server, since signaling will be purely within the node.

SIP signaling within the SIP session after the 200 Ok (in-session signaling), i.e. when the SIP session has become an established SIP session, will not traverse the I-CSCF server, but will run directly from the S-CSCF server associated with the calling party to the S-CSCF server associated with the called party. When the calling party and the called party are registered in the same S-CSCF server, then this results in less signaling for the in-session transaction compared to the case where calling party and called party are not registered in the same S-CSCF server, since signaling will be purely within the node.

SUMMARY OF THE INVENTION

It is an object of the invention to provide improved selection of a call session establishing server in a Voice over Internet Protocol (VoIP) network.

Thereto is provided a method for selecting for a subscriber a call session establishing server to be registered with in a VoIP network. The method including the steps:
  maintaining in a memory:
    a subscriber list corresponding to said subscriber, the subscriber list including information representative of further subscribers with which said subscriber has been engaged in a session via the VoIP network, and
    a server list corresponding to said subscriber for including identifiers of call session establishing server, and for including for each of the listed call session establishing servers a ranking;
  determining for each of the listed further subscribers a ranking representative of the relative frequency said subscriber has been engaged with that further subscriber in a session via the VoIP network, and including the ranking in the subscriber list corresponding to said subscriber;
  checking for each of the listed further subscribers whether that further subscriber is registered in a call session establishing server, and if so
    when the call session establishing server is not yet included in the server list, adding an identifier of said call session establishing server to the server list and associating the ranking of said further subscriber to said call session establishing server, and
    when the call session establishing server is already included in the server list, adding the ranking of said further subscriber to the ranking associated with said call session establishing server; and
  as part of the registration procedure, selecting from the server list the call session establishing server with the highest ranking.

In an embodiment the VoIP network is an Internet Protocol (IP) Multimedia Subsystem (IMS) network. Then, the call session establishing server is a Serving Call Session Control Function (S-CSCF) server.

The method exploits traffic behaviour of subscribers of the VoIP network to realize optimized allocation of subscribers to call session establishing servers.

The selection of the call session establishing server for a subscriber to be registered with takes traffic activity of that subscriber into consideration, such as whether the subscriber generates high or low amount of traffic. Also, the selection of the call session establishing server considers the typical destination c.q. origin of the VoIP session into account. For example:

Case a) For 5% of the VoIP sessions to/from subscriber S, calling and called party reside in the same call session establishing server. For 95% of the VoIP sessions to/from subscriber S, calling and called party reside in different call session establishing servers.

Case b) For 95% of the VoIP sessions to/from subscriber S, calling and called party reside in the same call session establishing server. For 5% of the VoIP sessions to/from subscriber S, calling and called party reside in different call session establishing servers.

Clearly, case b) is preferred, as for 95% of the VoIP sessions to/from subscriber S, there will be optimized VoIP signaling, compared to 5% of the VoIP sessions to/from subscriber S. The inventors realized that this benefit can be achieved in that the allocation of subscriber to the call session establishing server as described herein considers the traffic by that subscriber, and in particular, considers the typical destination subscriber for VoIP sessions originated by that subscriber or the typical origination subscriber for VoIP sessions destined for that subscriber.

According to an aspect is provided a network node in a VoIP network, the network node being arranged for, e.g. during registration of a subscriber, accessing a memory. The memory includes a subscriber a list corresponding to a subscriber, the subscriber list including information representative of further subscribers with which said subscriber has been engaged in a session via the VoIP network, the subscriber list including for each of the listed further subscribers a ranking representative of the relative frequency said subscriber has been engaged with that further subscriber in a session via the VoIP network. The memory also includes a server list corresponding to said subscriber for including identifiers of call session establishing servers, and for including for each of the listed call session establishing servers a ranking. The network node is arranged for checking for each of the listed further subscribers whether that further subscriber is registered in a call session establishing server, and if so
- when the call session establishing server is not yet included in the server list, adding an identifier of said call session establishing server to the server list and associating the ranking of said further subscriber to said call session establishing server, and
- when the call session establishing server is already included in the server list, adding the ranking of said further subscriber to the ranking associated with said call session establishing server. The network node is further arranged for selecting, e.g. as part of the registration procedure, from the server list the call session establishing server with the highest ranking.

It will be clear that the subscriber list can be part of a plurality of subscriber lists included in the memory, each subscriber list corresponding to a subscriber of a plurality of subscribers. Also, the memory can include a plurality of server lists, each corresponding to a subscriber of the plurality of subscribers.

According to an aspect, the further subscribers include originating further subscribers having originated a session with the subscriber, and terminating further subscribers the subscriber has originated a session with.

In an embodiment, the VoIP network is an IMS network, and the call session establishing server is a S-CSCF server. Then, the network node can be an Interrogating Call Session Control Function (I-CSCF) server, a Home Subscriber Server (HSS) or a database associated with an I-CSCF server or associated with an HSS, such as a Centralized user database (CUDB).

According to an aspect, the network node is arranged for performing the step of checking for the selected call session establishing server whether the subscriber can be registered with said selected call session establishing server on the basis of one or more of

- call session establishing server capabilities,
- call session establishing server load sharing among a plurality of call session establishing servers, and
- an operational condition of the selected call session establishing server.

In the event that the step of checking reveals that the subscriber cannot be registered with the selected call session establishing server, the network node can proceed by selecting from the server list the call session establishing server with the adjacent lower ranking. For this next call session establishing server the above of checking is repeated. This process can be repeated until a call session establishing server has been selected with which the subscriber can register.

According to an aspect, the network node is further arranged for registering the subscriber with the selected call session establishing server. These tasks can be split over two nodes. As an example, in an IMS network, it is possible that the HSS is the node that determines the server list of optimum S-CSCF servers. The HSS provides the server list of ranked S-CSCF servers to the I-CSCF server. The I-CSCF server selects a S-CSCF server (or second best, if it so turns out). The I-CSCF server forwards the Register request message to the selected S-CSCF server. This last step can be interpreted as registering the subscriber with the selected S-CSCF server.

According to an aspect, the network node is arranged for updating the subscriber list and the server list on the basis of sessions that the subscriber is engaged in after registration of the subscriber. Hence, the subscriber list and server list are up to date for re-registration or renewed registration.

According to an aspect the network node is arranged for moving the registration of the subscriber to another call session establishing server on the basis of the updated server list. It will be appreciated that moving the registration of the subscriber to another call session establishing server may require other nodes in the VoIP network to cooperate, as is known per se.

According to an aspect the subscriber list includes for each of the further subscribers a ranking representative of the relative frequency the subscriber has been engaged with that further subscriber in a session via the VoIP network during a predetermined period of time. Hence it is possible that the relative frequency is determined only for the predetermined period of time. This provides the advantage that the subscriber list is representative for the behaviour of the subscriber only during the predetermined period of time. This is based on the insight that historic subscriber behaviour prior to the predetermined period of time is less relevant in selecting the optimum call session establishing server for that subscriber. The predetermined period of time may e.g. be a week, 28 days, a month, a quarter, a year, or the like.

According to an aspect, the subscriber list excludes further subscribers belonging to a different VoIP network than the VoIP network the subscriber belongs to.

According to an aspect is provided a system including a network node as described hereinabove and a memory, wherein the memory is a Centralized user database (CUDB).

A method and network node are provided for selecting for a subscriber a call session establishing server to be registered with in a VoIP network. For the subscriber in a memory a subscriber list is maintained including for further subscribers a ranking representative of the relative frequency said subscriber has been engaged with that further subscriber in a session via the VoIP network. In the memory a server list is maintained and updated including identifiers of call session establishing servers, and for each of the listed call session establishing servers a ranking representative of the cumulative relative frequencies further subscribers registered with that call session establishing server have been engaged with the subscriber in a session via the VoIP network. From the server list the call session establishing server with the highest ranking is selected for the subscriber to be registered with.

BRIEF DESCRIPTION OF THE DRAWINGS

The invention will now be further elucidated by means of non-limiting examples referring to the drawings, in which FIG. 1 is an example of a subscriber list;

DETAILED DESCRIPTION

Figure 2:
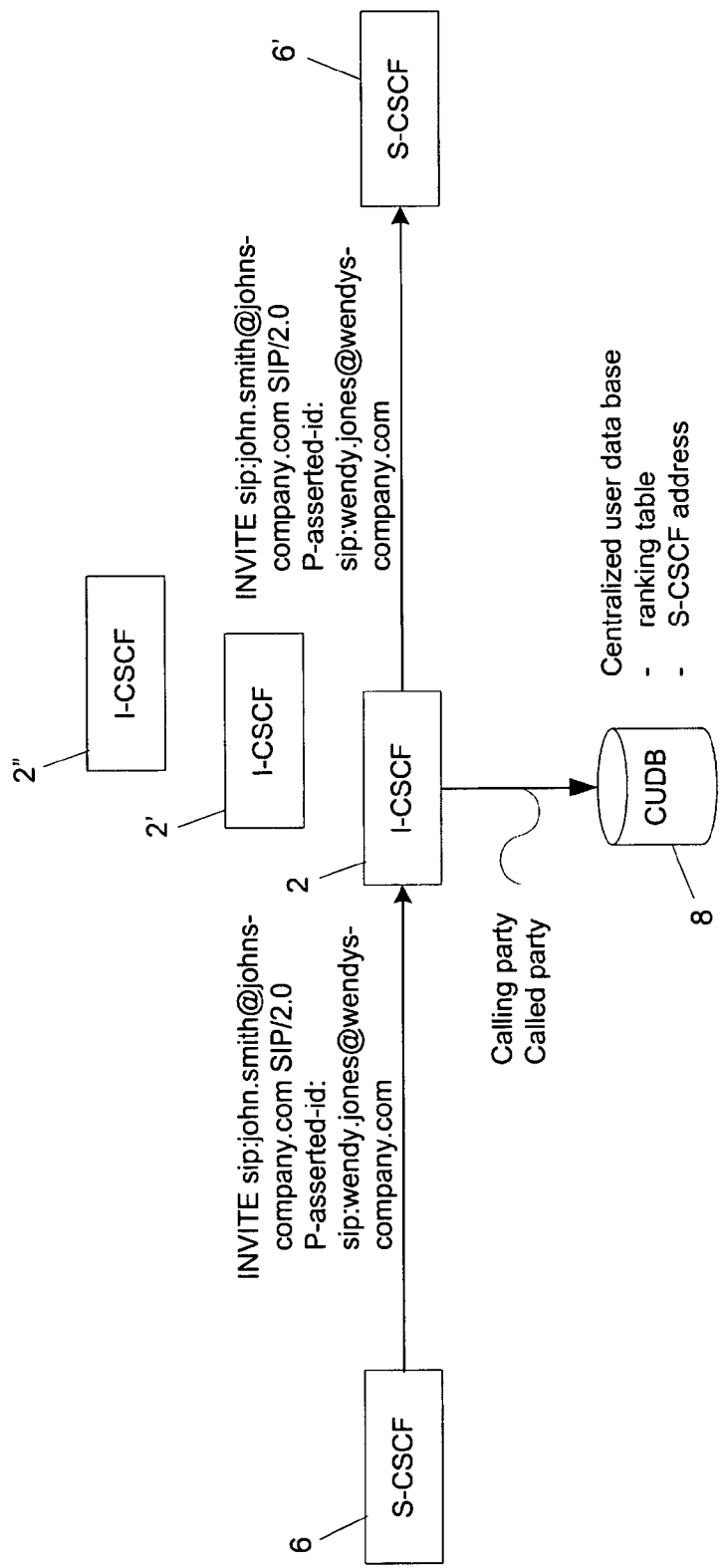
FIG. 2 is an example of part of the process (call establishment and corresponding update of subscriber list)

In this example, an Internet Protocol (IP) Multimedia Subsystem (IMS) network is discussed as an example of a Voice over Internet Protocol (VoIP) network. Such IMS network generally contains a plurality of Serving Call Session Control Function (S-CSCF) servers (6, 6'). The S-CSCF server herein is an example of a call session establishing server with which a subscriber can be registered in the VoIP network.

In this example, the IMS network maintains an overview per subscriber S of that network about the most frequently called or calling parties. The called or calling parties are in this example further subscribers of the IMS network. The overview is herein referred to as subscriber list since it lists further subscribers. FIG. 1 shows an example of a subscriber list that is maintained for Subscriber S, with a ranking of mutually different further subscribers up to position 10. For each further subscriber on the subscriber list a relative frequency is given representative of how often the further subscriber calls and/or is called by the subscriber S. In this example the relative frequency is determined on the basis of the number of calls. It is also possible that the relative frequency is determined on the basis of the time duration of the calls. In this example, the relative frequency is given as a percentage of the calls made to and by subscriber S. It will be appreciated that similar subscriber lists are maintained for other subscribers in the IMS network.

When subscriber S registers in the IMS network, the IMS network uses said subscriber list for subscriber S, indicating the terminating further subscribers most frequently called by subscriber S and/or the originating further subscribers most frequently calling subscriber S.

To determine which S-CSCF server for subscriber S would lead to optimized SIP signaling between subscriber S and these most frequently called or calling further subscribers, a check is done for each of the further subscribers included in the subscriber list. In this example, the check is done by an Interrogating Call Session Control Function (I-CSCF) server. This check is used to determine in which S-CSCF that further subscriber is currently registered. Thereto, a server list corresponding to said subscriber S is constructed or maintained. This server list includes identifiers of S-CSCF servers and for each of the listed S-CSCF servers a ranking. When the S-CSCF server that the further subscriber is registered with is not yet included in the server list, an identifier of said S-CSCF server is added to the server list, and to that S-CSCF server a weight is assigned equal to the relative frequency assigned to that further subscriber in the subscriber list. When the S-CSCF server the further subscriber is registered with was already included in the server list, the weight of that S-CSCF is incremented with the weight equal to the relative frequency assigned to that further subscriber in the subscriber list.

The S-CSCF server with the highest accumulated weight will be the S-CSCF server that has the highest probability of being the S-CSCF server where the terminating further subscriber or originating further subscriber, relative to subscriber S, will be registered. Hence, subscriber S will be registered in that S-CSCF server, resulting in expected optimized SIP signaling for SIP sessions to and from subscriber S.

While the I-CSCF server uses the above-described server list to determine in which S-CSCF server the subscriber S can best be registered, the I-CSCF server shall still consider other criteria for selecting a S-CSCF server. Such criteria include (i) S-CSCF server capabilities, (ii) S-CSCF server load sharing and (iii) S-CSCF server operational condition. However, within the constraint of these regular criteria, the I-CSCF server may still end up selecting a S-CSCF server that will be optimized for subscriber S, considering the expected traffic to and from that subscriber.

As follows from the example given in FIG. 1, ranking of further subscribers 1 to 10 does not have to accumulate to 100%. In this example, 96% of the calls to/from subscriber S are to/from frequent calling/called further subscribers. The subscriber list may have longer depth, e.g. ranking up to position 20. However, lower rankings have less weight for selecting the optimum S-CSCF server. The optimum length of the subscriber list, to be applied to all subscribers, may be determined through mathematical calculation. It will depend on the call characteristics of the subscribers of the network and so, it may differ per network. Hence, a network operator may, when applying the method proposed herein, perform calculations to determine the optimum depth of the subscriber list.

The subscriber list includes further subscribers from the IMS network with which the subscriber S is registered only. When subscriber S establishes a SIP session to/from a further subscriber that belongs to a different IMS network, then that further subscriber can in any case not be registered in the same S-CSCF server as the subscriber S.

The method as described in this example has two main aspects: (i) updating the subscriber list per subscriber S at call establishment and (ii) selecting the optimum S-CSCF server during registration of that subscriber S.

Every Session Initiation Protocol (SIP) session that is established between subscribers of a particular IMS network traverses an Interrogating Call Session Control Function (I-CSCF) server of that IMS network. The I-CSCF server hence has the capability to update the subscriber lists of the respective parties in that call. Consider that a call is established from subscriber S to subscriber T, then for both subscriber S and subscriber T, the subscriber list will be updated.

Referring to FIG. 2, the initial Invite transaction passing the I-CSCF server 2 may be as follows (only request line and PAI header shown in Invite message):

INVITE sip:john.smith@johns-company.com SIP/2.0
P-asserted-id: sip:wendy.jones@wendys-company.com The I-CSCF server 2 can determine from the sender of the SIP Invite request message, and from the destination of the SIP Invite request message whether calling and called party belong to the same IMS network. If the SIP Invite request message is received from a S-CSCF server 6 of the same network (which follows from the Via header), then the calling party belongs to the same IMS network as the I-CSCF server. Alternatively, DNS query may be used to determine whether the called subscriber (as identified in request line) and calling subscriber (as identified in the P-asserted-id header) belong to the same IMS operator. Regarding the called party, the I-CSCF server can conclude from the response from the Home Subscriber Server (HSS) whether the called party belongs to the same IMS network as the I-CSCF server. If the I-CSCF server determines that the calling party and the called party belong to the same IMS network, then they qualify for having their subscriber lists updated.

This initial Invite will lead to the following subscriber list updates:

(1) For wendy.jones@wendys-company.com, the ranking table will be updated as follows. If john.smith@johns-company.com is not in the subscriber list yet, it will be added to the subscriber list and will be given call rate 1. With call rate 1, it will be at the bottom of the subscriber list. If john.smith@johns-company.com is already in the subscriber list, the call rate of john.smith@johns-company.com will be incremented by 1. After that, the ranking within the subscriber list is recalculated.

(2) For john.smith@johns-company.com, the subscriber list will be updated as follows. If wendy.jones@wendys-company.com is not in the subscriber list yet, it will be added to the subscriber list and will be given call rate 1. With call rate 1, it will be at the bottom of the subscriber list. If wendy.jones@wendys-company.com is already in the subscriber list, the call rate of wendy.jones@wendys-company.com will be incremented by 1. After that, the ranking within the subscriber list is recalculated.

The description above indicates that for each subscriber list, the ranking is updated for every call. However, instead of updating the ranking for every call, the subscriber list may maintain just a list of called and calling destinations. When this subscriber, subscriber S, applies registration in the IMS network, the subscriber list for subscriber S, which is then rather a call log than a ranking table, is consulted to ad hoc determine the optimum S-CSCF server for subscriber S.

There may be multiple I-CSCF servers 2, 2', 2" in the network. Hence the subscriber lists should preferably not be maintained in the I-CSCF server, but should be kept external to the I-CSCF. A Centralized user database (CUDB) 8 would be an appropriate entity for keeping the subscriber lists.

The instruction from the I-CSCF server 2 to the CUDB 8 contains an identity of the calling party as well as an identity of the called party. That information suffices for CUDB to update the subscriber list for this calling party. As described above, the I-CSCF server has determined, prior to sending the subscriber list update instruction to the CUDB, that calling and called party both belong to this IMS network, hence the subscriber list update instruction is justified.

The CUDB is logically a single database. From implementation point of view, it can be a distributed database. The I-CSCF server may, therefore, send the instruction to update a subscriber's subscriber list to a configured address for the CUDB.

Figure 3:
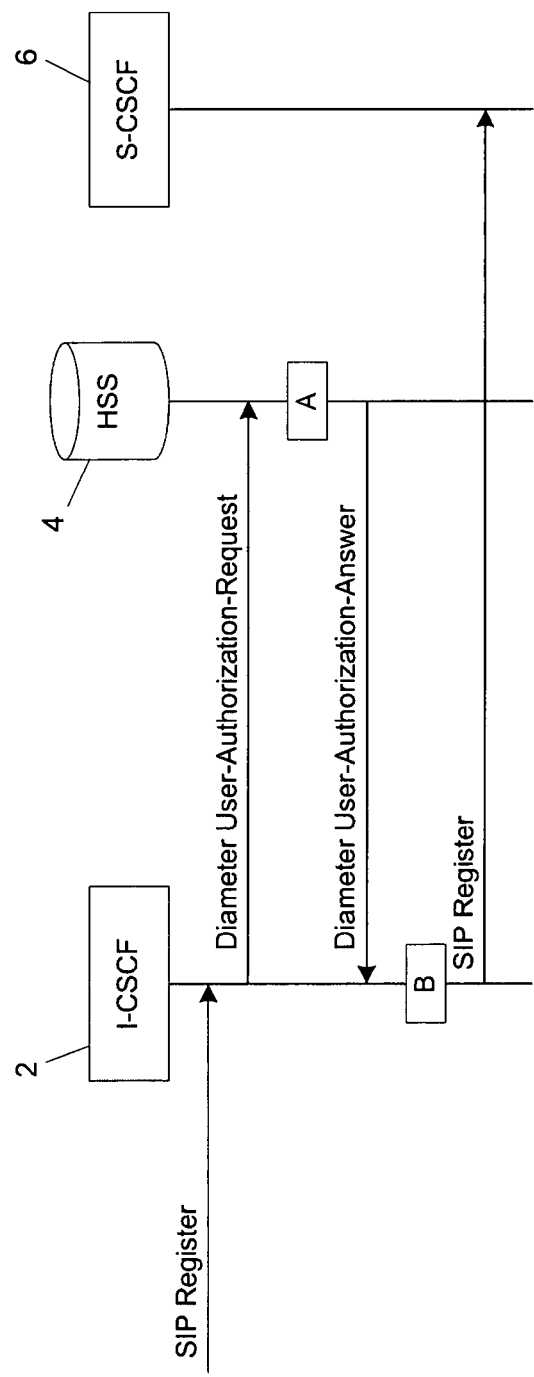
FIG. 3 is an example of part of the process (registration of subscriber)

When subscriber S performs an initial IMS registration, the I-CSCF server will request the HSS to provide S-CSCF server capabilities, upon which the I-CSCF server will select an appropriate S-CSCF server (see FIG. 3).

At A the HSS 4 determines the S-CSCF server 6 capabilities applicable for the subscriber S that is performing the initial IMS registration. At B the I-CSCF server 2 selects an appropriate S-CSCF server 6, that matches the S-CSCF server capabilities received from the HSS 4. According to the prior art, the I-CSCF server 2 would not have taken the call history of subscriber S into consideration for the selection of the S-CSCF server 6.

According to the invention, step A in FIG. 3 is enhanced in the sense that the HSS 4 checks the subscriber list of the subscriber S to determine the optimum S-CSCF server 6 to be allocated to subscriber S. Hereto, the HSS 4 takes the following steps:

1. Retrieve the subscriber list of subscriber S.

2. For each of the entries (further subscribers) in the subscriber list, determine whether that entry is currently registered in a S-CSCF server. If yes, then add the ranking rate of this entry to that S-CSCF in the server list. This results in listing zero or more S-CSCF servers, each S-CSCF server having an accumulated ranking rate. This accumulated ranking rate of a S-CSCF server in this list represents the relative likelihood that a communication session to/from subscriber S will be to/from that S-CSCF server.

3. Include the identity of the S-CSCF server with the highest ranking in the Diameter response to the I-CSCF server, and potentially the identity of S-CSCF server(s) of lower ranking.

The HSS is developed as CUDB front-end application. The HSS will, acting as CUDB front-end application, retrieve subscriber data from the CUDB back-end database. The HSS front-end will obtain subscriber data from subscriber S only, whereby subscriber S is the subscriber to be registered. When the HSS CUDB front-end application obtains subscriber data of subscriber S from the HSS back-end, it may include a request to CUDB back-end to perform above-described step 2. The CUDB back-end has the required information available. Specifically, CUDB back-end has the registration state per further subscriber, including the S-CSCF server address for a further subscriber. So, the CUDB back-end can perform step 2. It will be understood that for implementation of this method, various variants can be defined, without deviating from the principle of the invention.

The I-CSCF server will, when receiving Diameter User authorization answer (UAA), use this identity of the S-CSCF server with the highest ranking in its selection procedure for selecting a S-CSCF server for the subscriber S. The I-CSCF server may, depending on implementation, take the following steps:

1. Determine whether it has an indication that this indicated S-CSCF server with the highest ranking is currently not operational. If this S-CSCF server is currently marked as not operational, then the I-CSCF server would not select that S-CSCF server for registering the subscriber S, but would be compelled to select another S-CSCF server. The I-CSF server would in that case select the S-CSCF that has second highest ranking, provided that no prohibition exists for selecting that S-CSCF (with second highest ranking).

2. Determine whether load sharing rules prohibit the selection of this indicated S-CSCF with the highest ranking. If the registration load on that S-CSCF server is e.g. in excess of 50%, then the I-CSCF server may, according to load sharing rule, be compelled to select another S-CSCF server.

3. Determine whether the indicated S-CSCF server with the highest ranking supports the required capability for this subscriber S.

If none of the above listed steps prohibits the I-CSCF server to select this indicated S-CSCF server with the highest ranking, then the I-CSCF server selects that S-CSCF server. The subscriber S is now registered with the optimum S-CSCF server, yielding highest expectation that communication to/from that subscriber S will be from/to a further subscriber registered in the same S-CSCF server.

The HSS will, according to prior art, update the registration state of the subscriber S, including the S-CSCF server address assigned to this subscriber S. This updating occurs when the HSS receives the Diameter Server assignment request (SAR) from the allocated S-CSCF server where the subscriber S is registered.

Let subscriber T be a further subscriber present in the ranking list of subscriber S. When subscriber T himself/herself performs an initial IMS registration, then the S-CSCF server currently assigned to the subscriber S will be taken into consideration for selecting the S-CSCF server for the subscriber T, in accordance to the above-described procedure steps.

Figure 4:
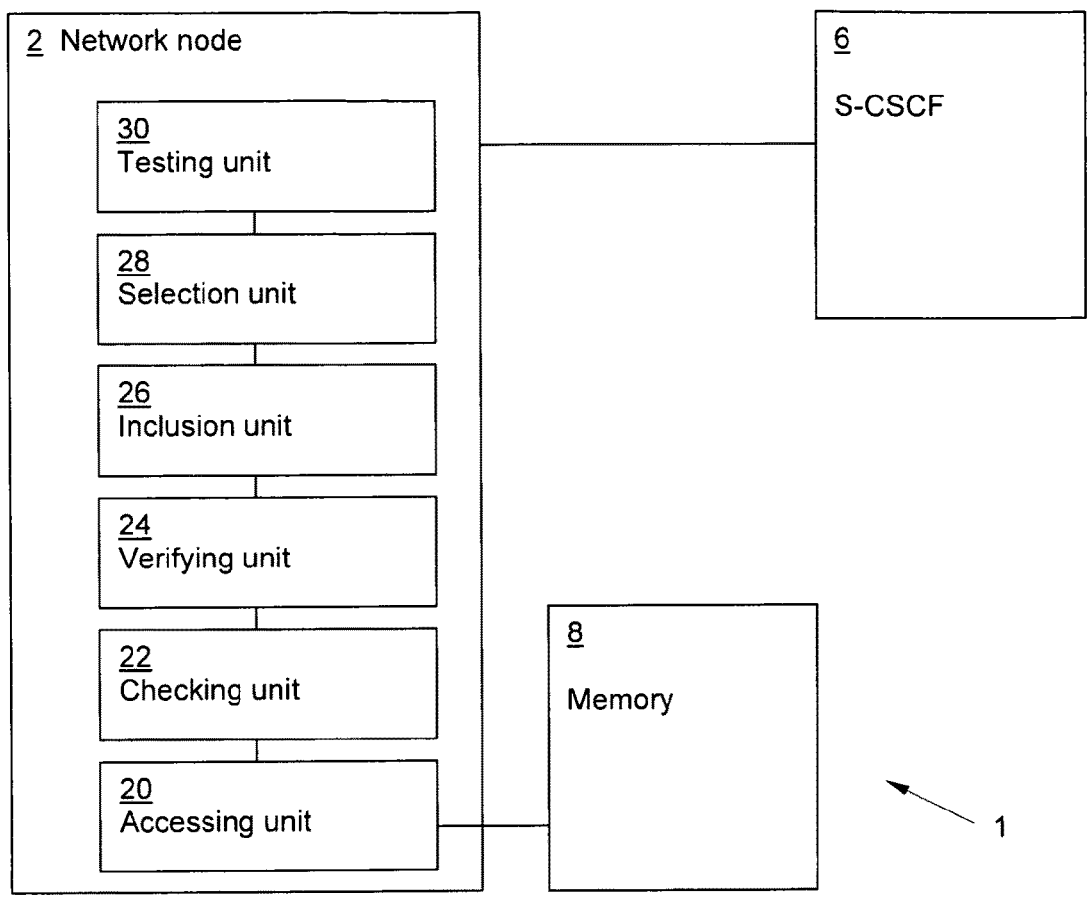
FIG. 4 in an example of an embodiment of a communications network system.

FIG. 4 shows an example of an embodiment of a communications network system 1. In this example, the communications network system 1 is an IMS network. The system 1 includes a network node 2. In this example the network node 2 is an I-CSCF server. The network node 2 includes an accessing unit 20 arranged for accessing a memory 8. In this example, the memory is formed by a Centralized user database (CUDB).

The memory includes a subscriber a list corresponding to the subscriber S. The memory can include a plurality of subscriber lists, each corresponding to a respective subscriber of a plurality of subscribers. The subscriber list includes information representative of further subscribers with which the subscriber S has been engaged in a session via the network. The subscriber list includes for each of the further subscribers on the subscriber list a ranking representative of the relative frequency the subscriber S has been engaged with that further subscriber in a session via the network. In this example, the memory 8 also includes further subscriber lists corresponding to other subscribers. The memory further includes a server list corresponding to the subscriber S. The server list is designed for including identifiers of call session establishing servers (such as S-CSCF servers), and for including for each of the listed call session establishing servers a ranking.

The network node 2 includes a checking unit 22. The checking unit 22 is arranged for checking for each of the further subscribers on the subscriber list whether that further subscriber is registered in a call session establishing server 6. In this example, the call session establishing server is formed by a S-CSCF 6. The network node 2 further includes a verifying unit 24. The network node 2 further includes an inclusion unit 26. When the checking unit 22 determines that a further subscriber is registered in a call session establishing unit 6, the verifying unit 24 checks whether or not that call session establishing server is already included in the server list. When the verifying unit 24 determines that said call session establishing server 6 is not yet included in the server list, the inclusion unit 26 adds an identifier of said call session establishing server 6 to the server list and associates a ranking of said further subscriber to said call session establishing server in the server list. When the verifying unit 24 determines that said call session establishing server 6 is already included in the server list, the inclusion unit 26 adds the ranking of said further subscriber to the ranking associated with said call session establishing server in the server list.

The network node 2 further includes a selection unit 28. The selection unit 28 is arranged for selecting from the server list the call session establishing server with the highest ranking.

In this example, the network node 2 also includes a testing unit 30. The testing unit is arranged for checking for the selected call session establishing server 6 whether the subscriber S can be registered with said selected call session establishing server 6. The checking is performed on the basis of one or more of call session establishing server capabilities, call session establishing server load sharing among a plurality of call session establishing servers, and an operational condition of the selected call session establishing server. If the testing unit 30 determines that the subscriber S can be registered with the selected call session establishing server 6, the network node 2 initiates the registration process for the subscriber S with the selected call session establishing server.

If the testing unit 30 determines that the subscriber S can not be registered with the selected call session establishing server 6, the testing unit instructs the selection unit 28 to select from the server list the call session establishing server with the adjacent lower ranking. Then, the testing unit 30 then checks for this selected call session establishing server with the adjacent lower ranking whether the subscriber S can be registered with that selected call session establishing server. This process is repeated until the testing unit 30 determines that the subscriber S can be registered with the selected call session establishing server.

It will be appreciated that the accessing unit 20, checking unit 22, verifying unit 24, inclusion unit 26, selection units 28, and testing unit 30 can be embodied as dedicated electronic circuits, possibly including software code portions. The accessing unit 20, checking unit 22, verifying unit 24, inclusion unit 26, selection units 28, and testing unit 30 can also be embodied as software code portions executed on, and e.g. stored in a memory of, a programmable apparatus such as a computer It is described in previous sections that for the subscriber S, the subscriber list is compiled based on accumulation of calls established to/from that subscriber S, so far as the calls are established between subscribers of the same network.

In an embodiment, it is assumed that when the subscriber S has at any moment a high ranking for further subscriber T, that that high ranking for further subscriber T would apply indefinitely. Therefore, it is additionally proposed that the subscriber list for the subscriber S is based on calls covering a designated time window. This time window may e.g. be the last 28 days. Other time window values may also be considered. Call entries older than said time window will be removed from the call list for the subscriber S and will not be taken into account for determining the subscriber ranking in the subscriber list.

In this manner, the subscriber ranking in the subscriber list for each subscriber will be a dynamic property, changing over time in accordance with the call behaviour of the subscriber.

In the foregoing specification, the invention has been described with reference to specific examples of embodiments of the invention. It will, however, be evident that various modifications and changes may be made therein without departing from the broader spirit and scope of the invention as set forth in the appended claims.

Up to this point it has been described that the subscriber S can be allocated to an optimum S-CSCF server at the moment that that subscriber S performs initial registration. However, as also described, a subscriber's subscriber list is not a static property, but may change over time, depending on the call behaviour of that subscriber S. This may lead to a situation whereby at a moment $t=T1$, a first S-CSCF server (S-CSCF(a)) would be the optimum S-CSCF server for the subscriber S, while at a different moment t=T2, with T2>T1, a second S-CSCF server (S-CSCF(b)) would be the optimum S-CSCF server for the subscriber S. However, the subscriber S may not perform initial registration at T2, so the subscriber S remains registered with a sub-optimal S-CSCF server.

It is known that a subscriber may be moved from one S-CSCF server to another S-CSCF server. Such moving a subscriber from one S-CSCF server to another S-CSCF server can be used to align S-CSCF server allocation for the subscriber S with that subscriber's current subscriber list. During low traffic period, e.g. between 03h00 and 05h00, an administrative process may be run that determines whether certain subscribers should be moved to another S-CSCF server in order to optimize the S-CSCF server allocation for that subscriber.

In this manner, as the traffic behaviour of a subscriber changes, possibly resulting in another S-CSCF server becoming the optimized S-CSCF server, that subscriber may, at some moment, be moved to that other S-CSCF server which had become the optimized S-CSCF server.

It shall be understood that the processing power and network signaling required for moving a subscriber from one S-CSCF server to another S-CSCF server best not outweigh the expected advantage of that subscriber being registered in the optimum S-CSCF server. For that reason, moving a subscriber to that subscriber's optimum S-CSCF server may be restricted to those subscribers for whom the ranking of the optimum S-CSCF server has a relatively high value. Consider the following two examples:

Case a
S-CSCF (1) has 80% ranking
S-CSCF (2) has 20% ranking
S-CSCF (3) has 20% ranking
Case b
S-CSCF (1) has 45% ranking
S-CSCF (2) has 35% ranking
S-CSCF (3) has 35% ranking For case a), it may be worthwhile to move the subscriber to his/her optimum S-CSCF server, whilst for case b), it may not be worthwhile to move the subscriber to his/her optimum S-CSCF server. When determining whether it's worth to move a subscriber at some point in time to that subscriber's optimum S-CSCF server depends not only on the relative ranking position of the optimum S-CSCF server, but also on the call rate for that subscriber. If the subscriber has a high call rate with peers that have high ranking rate, then that increases the advantage of moving the subscriber to his/her optimum S-CSCF server.

The above described method of adaptive subscriber distribution over S-CSCF servers has the advantages that it will lead to more optimized allocation of S-CSCF servers for a subscriber when that subscriber registers. As a result, SIP sessions established to/from that subscriber have a higher chance of taking place within the same S-CSCF server, i.e. calling and called party residing in the same S-CSCF server.

This may, in turn, lead to a reduced load in the IMS core network (CSCF node) as well as less inter-node IP signaling. The load saving may, as a derived result, lead to increased subscriber and call capacity for the S-CSCF server, reducing CAPEX and OPEX related to the IMS core network.

The applicability of the described method is not limited to voice calls, but includes also video calls, messaging and other IMS based services between two subscribers of the IMS network. The described method is also generally applicable in VoIP networks.

However, other modifications, variations, and alternatives are also possible. The specifications, drawings and examples are, accordingly, to be regarded in an illustrative rather than in a restrictive sense.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

The invention claimed is:

1. A network node in a Voice over Internet Protocol (VoIP) network, wherein:
    the network node is arranged to access a memory that includes
        a subscriber list, being part of a multitude of subscriber lists, corresponding to a subscriber, the subscriber list including information representative of further subscribers with which said subscriber has been engaged in a session via the VoIP network, the subscriber list including for each of the listed further subscribers a ranking representative of the relative frequency said subscriber has been engaged with that further subscriber in a session via the VoIP network, and
        a server list corresponding to said subscriber for including identifiers of call session establishing servers, and for including for each of the listed call session establishing servers a ranking;
    the network node is arranged to check, for each of the listed further subscribers, whether that further subscriber is registered in a call session establishing server, and, if so:
        when the call session establishing server is not yet included in the server list, to add an identifier of said call session establishing server to the server list and to associate the ranking of said further subscriber to said call session establishing server, and
        when the call session establishing server is already included in the server list, to add the ranking of said further subscriber to the ranking associated with said call session establishing server, and
    the network node is arranged to select from the server list the call session establishing server with the highest ranking.

2. The network node of claim 1, wherein the network node is arranged to check, for the selected call session establishing server, whether the subscriber can be registered with said selected call session establishing server on the basis of one or more of:
    call session establishing server capabilities;
    call session establishing server load sharing among a plurality of call session establishing servers; and
    an operational condition of the selected call session establishing server;
wherein the network node is further arranged to, in the event that the subscriber cannot be registered with said selected call session establishing server on the basis of the preceding criteria, to select from the server list the call session establishing server with the adjacent lower ranking.

3. The network node of claim 1, wherein the network node is further arranged to register the subscriber with the selected call session establishing server.

4. The network node of claim 3, wherein the network node is arranged to update the subscriber list and the server list on the basis of sessions that the subscriber is engaged in after registration of the subscriber.

5. The network node of claim 4, wherein the network node is arranged to move the registration of the subscriber to another call session establishing server on the basis of the updated server list.

6. The network node of claim 1, wherein the subscriber list includes, for each of the further subscribers, a ranking representative of the relative frequency the subscriber has been engaged with that further subscriber in a session via the VoIP network during a predetermined period of time.

7. The network node of claim 1, wherein the further subscribers include originating further subscribers having originated a session with the subscriber, and terminating further subscribers the subscriber has originated a session with.

8. The network node of claim 1, wherein the subscriber list excludes further subscribers belonging to a different VoIP network than the VoIP network the subscriber belongs to.

9. The network node of claim 1, wherein the VoIP network is an Internet Protocol Multimedia Subsystem (IMS) network, and wherein the call session establishing server is a Serving Call Session Control Function (S CSCF) server.

10. The network node of claim 1, wherein the network node is an Interrogating Call Session Control Function (I CSCF) server or a Home Subscriber server (HSS).

11. System including a network node claim 1 and a memory, wherein the memory is a Centralized user database (CUDB).

12. A method for selecting for a subscriber a call session establishing server to be registered with in a Voice over Internet Protocol (VoIP) network, the method comprising:
maintaining, in a memory,
a subscriber list corresponding to said subscriber, the subscriber list including information representative of further subscribers with which said subscriber has been engaged in a session via the VoIP network, and
a server list corresponding to said subscriber for including identifiers of call session establishing servers, and for including for each of the listed call session establishing servers a ranking;
determining, for each of the listed further subscribers, a ranking representative of the relative frequency said subscriber has been engaged with that further subscriber in a session via the VoIP network, and including the ranking in the subscriber list;
checking for each of the listed further subscribers whether that further subscriber is registered in a call session establishing server, and, if so,
when the call session establishing server is not yet included in the server list, adding an identifier of said call session establishing server to the server list and associating the ranking of said further subscriber to said call session establishing server, and
when the call session establishing server is already included in the server list, adding the ranking of said further subscriber to the ranking associated with said call session establishing server; and
selecting from the server list the call session establishing server with the highest ranking.

13. The method of claim 12, further comprising:
checking, for the selected call session establishing server, whether the subscriber can be registered with said selected call session establishing server on the basis of one or more of call session establishing server capabilities, call session establishing server load sharing among a plurality of call session establishing servers, and an operational condition of the selected call session establishing server; and
in the event that the subscriber cannot be registered with said selected call session establishing server on the basis of one or more of the preceding criteria, selecting from the server list the call session establishing server with the adjacent lower ranking.

14. A non-transitory computer-readable medium comprising, stored thereupon, software code portions arranged for performing, when run on a programmable apparatus:
maintaining, in a memory,
a subscriber list corresponding to said subscriber, the subscriber list including information representative of further subscribers with which said subscriber has been engaged in a session via a Voice over Internet Protocol (VoIP) network, and
a server list corresponding to said subscriber for including identifiers of call session establishing servers, and for including for each of the listed call session establishing servers a ranking;
determining, for each of the listed further subscribers, a ranking representative of the relative frequency said subscriber has been engaged with that further subscriber in a session via the VoIP network, and including the ranking in the subscriber list;
checking, for each of the listed further subscribers, whether that further subscriber is registered in a call session establishing server, and, if so,
when the call session establishing server is not yet included in the server list, adding an identifier of said call session establishing server to the server list and associating the ranking of said further subscriber to said call session establishing server, and
when the call session establishing server is already included in the server list, adding the ranking of said further subscriber to the ranking associated with said call session establishing server; and
selecting from the server list the call session establishing server with the highest ranking.

* * * * *